(12) United States Patent
Takada et al.

(10) Patent No.: US 12,496,599 B2
(45) Date of Patent: Dec. 16, 2025

(54) DISPENSER AND NOZZLE FOR DISCHARGING MIXTURE OF GAS AND PASTE MATERIAL AND MECHANICAL FOAMING DEVICE

(71) Applicant: SUNSTAR ENGINEERING INC., Osaka (JP)

(72) Inventors: Masaharu Takada, Osaka (JP); Kiichi Yamashita, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 709 days.

(21) Appl. No.: 17/789,366

(22) PCT Filed: Dec. 27, 2019

(86) PCT No.: PCT/JP2019/051559
§ 371 (c)(1),
(2) Date: Jun. 27, 2022

(87) PCT Pub. No.: WO2021/131055
PCT Pub. Date: Jul. 1, 2021

(65) Prior Publication Data
US 2023/0110347 A1    Apr. 13, 2023

(51) Int. Cl.
*B05B 7/00* (2006.01)
*B05B 7/14* (2006.01)
*B05B 12/00* (2018.01)

(52) U.S. Cl.
CPC .......... *B05B 7/0031* (2013.01); *B05B 7/1481* (2013.01); *B05B 12/008* (2013.01)

(58) Field of Classification Search
CPC ... B05B 7/0031; B05B 7/1481; B05B 12/008; B05C 11/1036; B05C 5/0237;
(Continued)

(56) References Cited

U.S. PATENT DOCUMENTS 4,465,212 A * 8/1984 Boone ................... B65B 51/023
251/333
5,089,190 A   2/1992 Trevathan et al.
(Continued)

FOREIGN PATENT DOCUMENTS

DE    3542767    6/1987
DE    4217835    12/1993
(Continued)

OTHER PUBLICATIONS

International Search Report issued Mar. 17, 2020 in International Application No. PCT/JP2019/051559.
(Continued)

*Primary Examiner* — Vishal Pancholi
(74) *Attorney, Agent, or Firm* — Wenderoth, Lind & Ponack, L.L.P.

(57) ABSTRACT

A dispenser used for discharging a mixture of gas and a paste material includes: a nozzle part provided in a tip end part of a body and having a tip end opening through which the mixture is discharged; a flow path extending from a mixture introduction part to the tip end opening through a hollow space of the nozzle part; a needle part movable in the flow path of the nozzle part to open and close the flow path; a driving part that drives the needle part; and a stopper part that limits an operation range of the needle part. The nozzle part has a tapered section in which an inside diameter of the flow path of the nozzle part decreases toward the tip end opening. Also provided is a stopper position adjusting part that adjusts a stop position defined by the stopper part.

7 Claims, 10 Drawing Sheets

(58) Field of Classification Search
CPC ... B05C 5/0216; B29B 7/7419; B29B 7/7409; B29B 7/7414; B29B 7/726; B29B 7/728; B29B 7/746; B29C 44/022; B29C 44/3442; B29C 44/461; B29C 44/50
See application file for complete search history.

(56) References Cited

U.S. PATENT DOCUMENTS

| | | | |
|---|---|---|---|
| 5,207,352 | A | 5/1993 | Porter et al. |
| 5,462,199 | A | 10/1995 | Lenhardt |
| 7,422,164 | B2 | 9/2008 | Matsumoto |
| 8,857,732 | B2 | 10/2014 | Brose et al. |
| 2004/0188001 | A1 | 9/2004 | Okuda et al. |
| 2008/0197209 | A1 | 8/2008 | Ganzer |
| 2009/0101669 | A1* | 4/2009 | Hassler, Jr. ........... B05C 5/0237 222/1 |
| 2010/0209592 | A1 | 8/2010 | Wanthal et al. |
| 2010/0258592 | A1* | 10/2010 | Tracy ...................... F04B 17/03 222/333 |
| 2011/0079618 | A1* | 4/2011 | Chastine ............. F16K 31/1221 222/542 |
| 2018/0264421 | A1 | 9/2018 | Nakanishi et al. |

FOREIGN PATENT DOCUMENTS

| | | |
|---|---|---|
| EP | 0040068 | 11/1981 |
| EP | 0 427 985 | 5/1991 |
| EP | 0 509 323 | 10/1992 |
| GB | 911566 | 11/1962 |
| JP | 3-178362 | 8/1991 |
| JP | 5-115816 | 5/1993 |
| JP | 2004-330600 | 11/2004 |
| JP | 2005-81647 | 3/2005 |
| JP | 2006-289276 | 10/2006 |
| JP | 2008-207176 | 9/2008 |
| JP | 2009-84480 | 4/2009 |
| JP | 2016-109776 | 6/2016 |
| JP | 2017-29904 | 2/2017 |
| JP | 2017-109192 | 6/2017 |
| WO | 00/029194 | 5/2000 |
| WO | 2016/125900 | 8/2016 |

OTHER PUBLICATIONS

Office Action issued Aug. 6, 2021 in corresponding European Patent Application No. 19861262.4.
Office Action issued Apr. 28, 2022 in corresponding European Patent Application No. 19861262.4.
Office Action issued Feb. 24, 2022 in EP Patent Application No. 21181719.2.
Extended European Search Report issued Nov. 18, 2021 in European Patent Application No. 21181719.2.
Counterclaim for Revocation issued Mar. 6, 2025 in European Patent No. 4108413.

* cited by examiner

Fig. 10

DISPENSER AND NOZZLE FOR DISCHARGING MIXTURE OF GAS AND PASTE MATERIAL AND MECHANICAL FOAMING DEVICE

TECHNICAL FIELD

The present invention is related to a dispenser and a nozzle for discharging a mixture of gas and a paste material.

BACKGROUND ART

A technique related to a dispenser is known by which a mixture obtained by mixing and micro-dispersing gas in a paste material is discharged and applied to an object (see PTL 1 listed below).

The dispenser transports the mixture (the mixture of the paste material and the gas) to a nozzle through a pipe at relatively high pressure (4 MPa or higher). The upper limit of the pressure of the mixture depends on the viscosity and the material temperature of the paste material in the transported mixture and is usually 12 MPa or lower. The reason is that, when the pressure of the mixture is too high, there is a possibility that the hardening agent in a powder form contained in the material may be crushed and may start a reaction to become hardened in the pipe and may clog the nozzle. Further, there is another possibility that the temperature may increase due to friction between the material and the pipe or the nozzle, which may start a reaction of the material.

In contrast, when the material is transported in the pipe while the pressure of the material is too low, the bubbles of the gas in the material become relatively large and may break when being rubbed against the lateral wall of the pipe during the transport. There is a possibility that the gas from the broken bubbles may aggregate, so that the clump of gas may become large at the time of the discharge, and the gas may escape at the time of the discharge from the nozzle. As a result, not only it will be impossible to realize a foamed body in which bubbles are evenly dispersed, but also it will be impossible to achieve a targeted foam expansion ratio.

CITATION LIST

Patent Literature

PTL 1: Japanese Patent Laid-Open No. 2016-109776

SUMMARY OF INVENTION

Technical Problem

In view of the circumstances described above, it is an object of the present invention to provide a dispenser, a nozzle, and a mechanical foaming device that make it possible to form a foamed body in which bubbles are appropriately dispersed in a paste material without clogging the nozzle.

Solution to Problem

To solve the problem presented above, a dispenser of the present invention used for discharging a mixture of gas and a paste material includes: a nozzle part provided in a tip end part of the dispenser and having a tip end opening through which the mixture is discharged; a flow path for the mixture extending from an introduction part for the mixture to the tip end opening through an inside of the nozzle part; a needle part movable in the flow path of the nozzle part to open and close the flow path; and a driving part that drives the needle part. The nozzle part has a tapered section in which an inside diameter of the flow path of the nozzle part decreases toward the tip end opening, the inside diameter being relative to an operation range of a tip end of the needle part. As a result of the tip end of the needle part abutting against a closed position of the tapered section, the flow path for the mixture is closed, whereas as a result of the tip end of the needle part moving away from the closed position, the flow path is opened. The dispenser further includes a stopper part that limits a moving range of the tip end of the needle part to a range from the closed position to a stop position located rearward relative to the closed position.

Preferably, the dispenser further includes a stopper position adjusting part that adjusts a position of the stopper part to change the stop position. More preferably, a rearmost position of the stop position adjusted by the stopper position adjusting part is a position distant from the closed position by a distance equal to or longer than four times a diameter of the tip end opening.

For example, as the stopper position adjusting part, the stopper part has a rod screwed into a body of the dispenser in an axial direction. A position of the rod in the axial direction is adjusted according to an amount of being screwed in the body. The needle part is stopped, as a result of a tip end part of the rod abutting against a basal end part of the needle part.

The stopper position adjusting part in a mode further includes an electric motor disposed to rotate the rod, so that the stop position is set by controlling a rotation amount of the rod rotated by the electric motor. In this mode, the dispenser preferably includes: a controller that controls the stop position; and a pressure sensor that measures pressure of the mixture in the flow path. The controller sets the stop position in such a manner that the pressure measured by the pressure sensor falls in a desired pressure range, with respect to a discharge flow amount of the mixture.

The stopper position adjusting part in another mode has a mechanism that makes the rod manually rotatable. In this mode, the dispenser preferably further includes: a pressure sensor that measures pressure of the mixture in the flow path; and a display unit that displays the pressure measured by the pressure sensor.

In the dispenser according to a preferable embodiment of the present invention, in the position distant rearward from the closed position by a distance four times the diameter of the tip end opening, the inside diameter of the flow path is 1.1 to 3 times larger than the diameter of the tip end opening.

A nozzle of the present invention connectable to a dispenser used for discharging a mixture of gas and a paste material includes: a nozzle part having a basal end opening through which the mixture is introduced and a hollow space penetrating inside so as to form a tip end opening through which the mixture is discharged; and a needle part inserted into the hollow space through the basal end opening. The nozzle part has a tapered section in which an inside diameter of the hollow space decreases toward the tip end opening. As a result of a tip end of the needle part abutting against a closed position of the tapered section, a flow path for the mixture is closed, whereas as a result of the tip end of the needle part moving away from the closed position, the flow path is opened. In the nozzle according to a preferable embodiment of the present invention, in a position distant rearward from the closed position by a distance four times a diameter of the tip end opening, the inside diameter of the hollow space is 1.1 to 3 times larger than the diameter of the tip end opening.

A mechanical foaming device of the present invention that discharges a mixture of gas and a paste material includes: a gas conduit used for transporting the gas; a material conduit used for transporting the paste material; a connection part to which the gas conduit and the material conduit are connected; a mixing part that mixes together the gas and the paste material coming out of the connection part; and the dispenser described above that receives a supply of the mixture of the gas and the paste material coming out of the mixing part.

The connection part according to a preferable mode is at least one piston pump. The gas conduit and the material conduit are connected to a cylinder of the piston pump. Into a cylinder space formed by raising a piston of the piston pump, the gas transported through the gas conduit and the paste material transported through the material conduit are supplied, so that the gas and the paste material in the cylinder space are pumped forward to the mixing part as a result of lowering the piston.

The connection part according to another preferable mode is a part in which the gas conduit is connected to the material conduit via a piston pump and an opening/closing valve. Into a cylinder space formed by raising a piston of the piston pump while the opening/closing valve is closed, the gas transported through the gas conduit is supplied, so that the gas in the cylinder space is compressed as a result of lowering the piston, and so that the compressed gas is mixed into the paste material transported through the material conduit as a result of opening the opening/closing valve.

The mechanical foaming device of the present invention may further include: a constant flow amount device that supplies, to the dispenser, the mixture of the gas and the paste material mixed by the mixing part, in a constant flow amount.

BRIEF DESCRIPTION OF THE DRAWINGS

FIGS. 2A and 2B are cross-sectional side views of the dispenser shown in FIG. 1. FIG. 2A shows a state in which the operation range is made largest by retreating the stop position of a needle part defined by the stopper part. FIG. 2B shows a state in which the operation range is made smallest by advancing the stop position of the needle part defined by the stopper part.

FIG. 7A is a side view of the electric stopper position adjusting part. FIG. FIG. 7B is an exploded perspective view of the electric stopper position adjusting part.

DESCRIPTION OF EMBODIMENTS

The following will describe a dispenser according to one embodiment of the present invention, with reference to the drawings.

Figure 1:
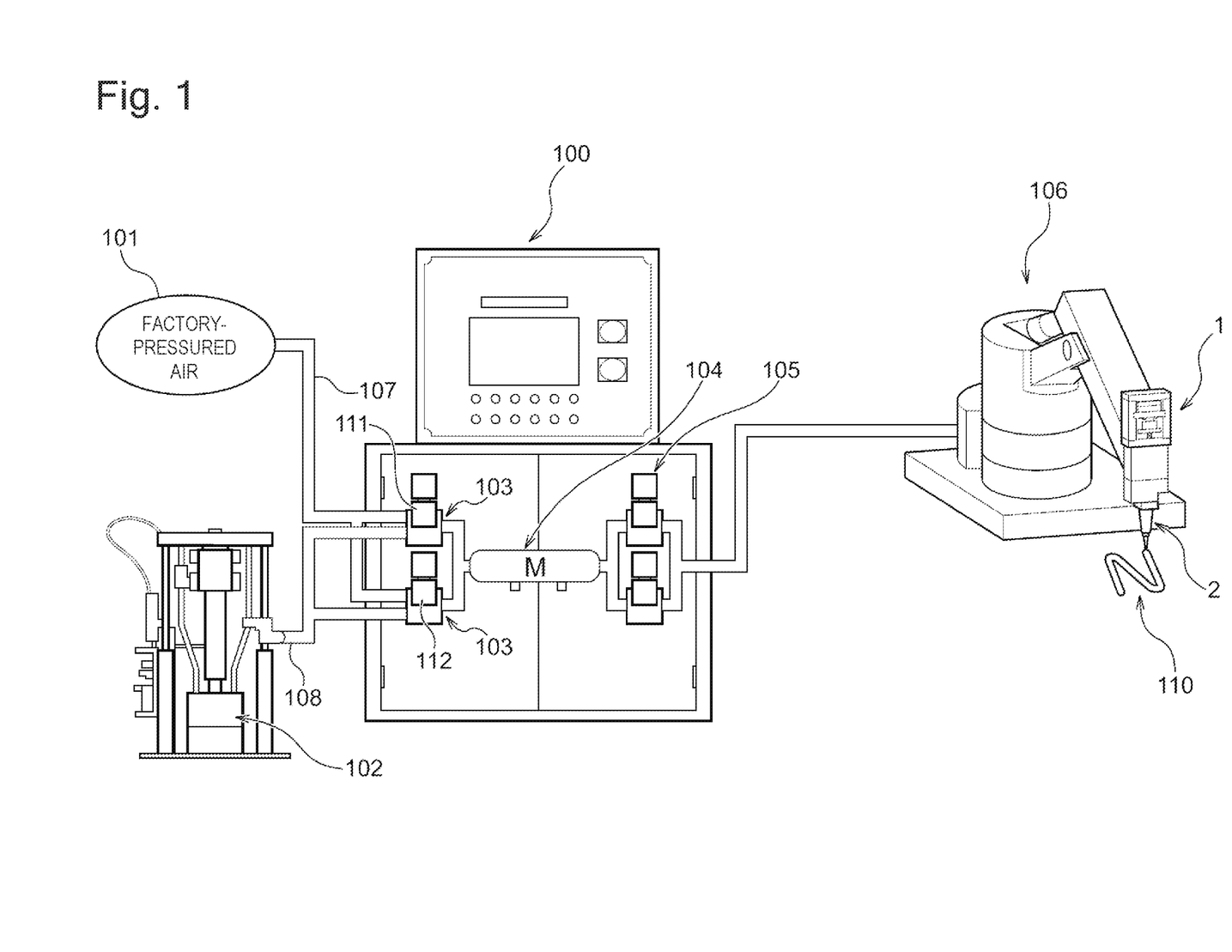
FIG. 1 is an overall schematic drawing of a mechanical foaming device that uses a dispenser according to an embodiment of the present invention.

FIG. 1 shows an example of a mechanical foaming device 100 that applies foam beads 110 to a surface by using a dispenser 1 according to the one embodiment of the present invention.

The mechanical foaming device 100 includes a gas conduit 107 transporting gas supplied from a gas supply source 101 (e.g., factory-pressured air); a material conduit 108 transporting a paste material supplied from a paste material supply source 102 (e.g., a pail pump); a connection part 103 to which the gas conduit 107 and the material conduit 108 are connected; a mixer 104 that mixes together the gas and the paste material coming out of the connection part 103; and a constant flow amount cylinder 105 that causes a flow of the mixture formed by the mixer 104 to be in a constant flow amount. Further, the mechanical foaming device 100 includes a robot 106 and the dispenser 1 having a nozzle part 2 and being attached to an arm of the robot 106. The dispenser 1 discharges, from the nozzle part 2, the mixture of the gas and the paste material supplied from the constant flow amount cylinder 105. The discharged mixture is foamed and applied to the surface. As a result of the robot 106 moving the dispenser 1 along a controlled track during the discharge from the nozzle part 2, a foamed body applied from the nozzle part 2 forms the foam beads 110 on the surface.

In this situation, the paste material is liquid resin (which may be a hot melt material) that has fluidity and is obtained by adding a hardening agent, a hardening accelerator, a filler, a stabilizer, an additive and/or the like to reactive liquid resin such as an isocyanate, alkoxy silyl, acryl, epoxy, or the like. When being discharged from the dispenser, the mixture of the paste material and the gas is in a state in which the gas is micro-dispersed in the paste material. After that, when the resin is hardened by thermosetting, moisture curing, LIV curing, or the like, the foamed body is formed.

As shown in FIG. 1, the connection part 103 in one mode includes, for example, two piston pumps 111 and 112 and is structured by connecting the gas conduit 107 and the material conduit 108 to each of the cylinders of the piston pumps 111 and 112. In the connection part 103, to cylinder spaces formed by rising the pistons of the piston pumps 111 and 112, the gas transported from the gas conduit 107 and the paste material transported from the material conduit 108 are sequentially supplied (in no particular order). As a result of lowering the pistons, the gas and the paste material in the cylinder spaces are pumped forward to the mixer 104. As a result of operating the two piston pumps 111 and 112 alternately, the mixture is incessantly supplied to the mixer 104. It is therefore possible to continuously discharge the beads 110 from the dispenser 1.

The connection part 103 in the abovementioned mode of the present invention does not necessarily need to have two piston pumps. It is acceptable to use one piston pump or three or more piston pumps.

Further, the mixer 104 may be a dynamic mixer or a static mixer. Alternatively, it is also acceptable to use a simple pipe without using a mixer. The reason is that, even in the pipe, bubbles of the gas are micro-dispersed while the material is being transported through the pipe, and it is possible to form a mixture in which the bubbles are dispersed in the material.

Figure 9:
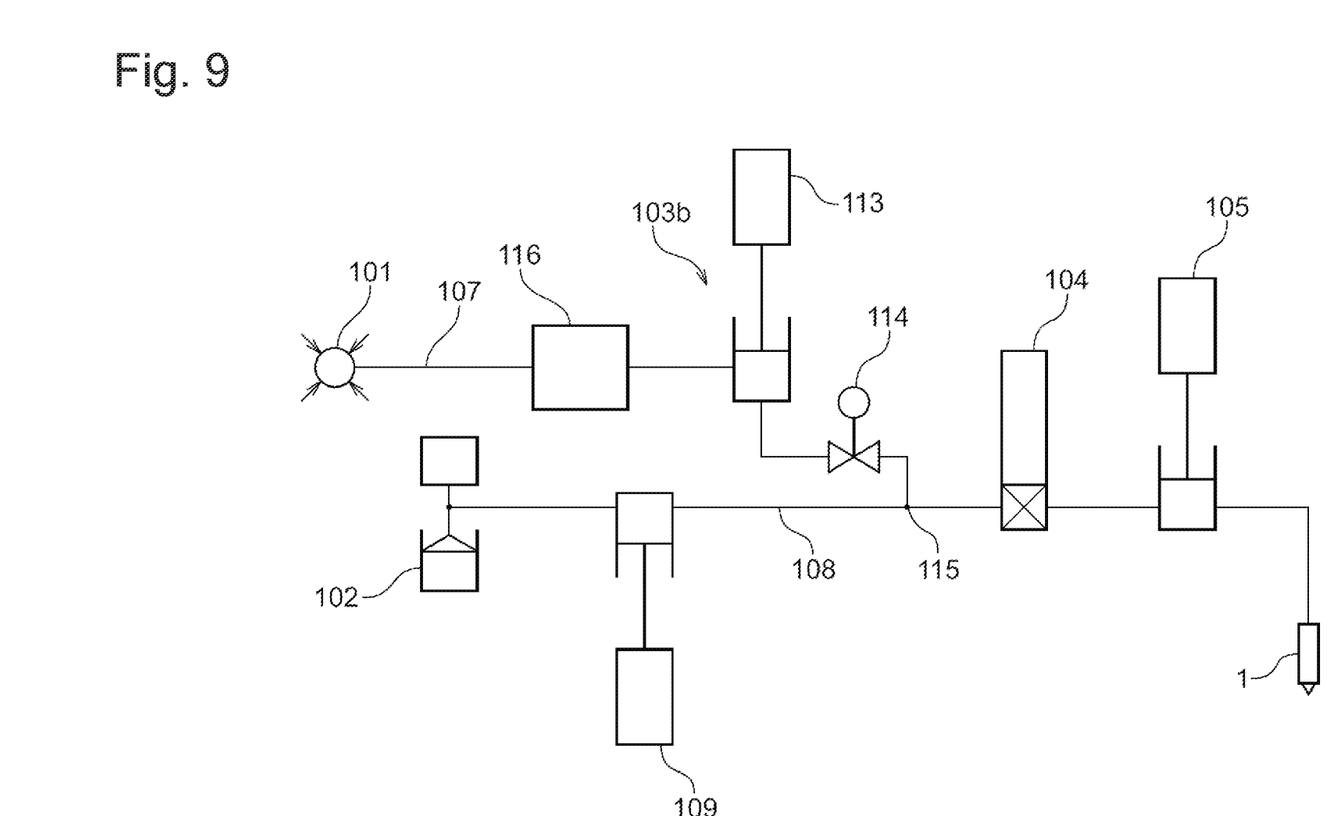
FIG. 9 is a schematic drawing showing another mode of the connection part of the mechanical foaming device shown in FIG. 1.

FIG. 9 shows a connection part 103b according to another mode of the present invention. As shown in FIG. 9, the connection part 103b is structured as a part in which the gas conduit 107 is connected to the material conduit 108 at a connection point 115 via a piston pump and an opening/closing valve 114. Preferably, the gas conduit 107 is connected to the material conduit 108 at the connection point 115 via a piston pump 113 and the opening/closing valve 114. In this mode, into the cylinder space formed by raising the piston of the piston pump while the opening/closing valve 114 is closed, the gas transported from the gas conduit 107 is forwarded while the gas amount is controlled by a gas supply device 116. As a result of lowering the piston, the gas in the cylinder space is compressed. As a result of opening the opening/closing valve 114, the compressed gas is mixed into the paste material being transported through the material conduit 108.

Because the cylinder space formed at the time of raising the piston of the piston pump 113 has a prescribed capacity, it is possible to keep constant the amount of the gas to be mixed into the paste material at the time of lowering the piston, by adjusting the amount of the gas forwarded by the gas supply device 116 so that the pressure of the gas in the cylinder space is at a prescribed level. In this situation, by further keeping constant the flow amount of the paste material flowing through the material conduit 108 by using a constant flow amount pump 109, it is possible to control the proportion between the amount of the paste material and the amount of the gas to be constant and to thus achieve a desired foam expansion ratio. In this situation, it is also possible to control the proportion between the amount of the paste material and the amount of the gas to be constant, by measuring the flow amount of the paste material flowing through the material conduit 108 and adjusting the gas amount in accordance with the flow amount of the paste material. Further, the flow amount of the paste material forwarded by the constant flow amount pump 109 may fluctuate, as long as the ratio between a total amount of the paste material and a total amount of the gas to be mixed therewith in a certain period of time is substantially constant. Alternatively, control may be exercised to substantially achieve a certain target value.

Figure 10:
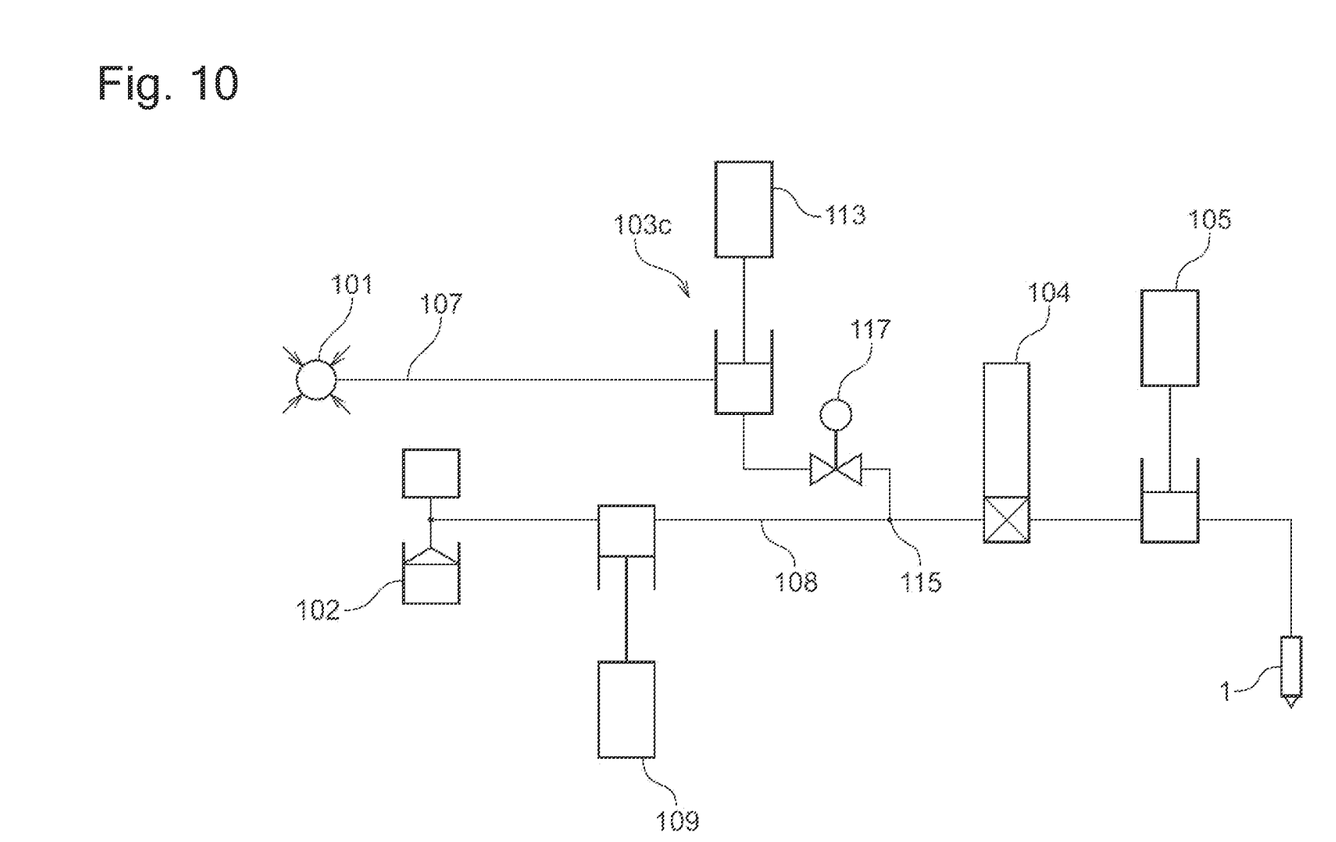
FIG. 10 is a schematic drawing showing yet another mode of the connection part of the mechanical foaming device shown in FIG. 1.

FIG. 10 shows a connection part 103c according to yet another mode of the present invention. In this mode, an opening/closing valve is structured as a needle- or ball-type pulse valve 117 so as to control the introduction of the gas. In this mode, it is possible to control the amount of the introduced gas per session or the amount of the introduced gas per time period, by adjusting the stroke of the needle of the opening/closing valve 117 or adjusting the frequency with which the needle is opened and closed. Further, it is preferable to omit the gas supply device 116 and to control the origin pressure of the gas supply source 101 by using a regulator or to keep the pressure constant by driving the piston pump 113. Another mode is also acceptable in which the pressure before the pulse valve 117 and the material pressure in the connection point 115 are measured and set, so as to control the amount of the introduced gas. In other words, in the mode shown in FIG. 10, it is possible to control the amount of the introduced gas with (1) differential pressure between the pressure before the pulse valve 117 and the material pressure at the connection point 115; (2) the flow amount of the paste material in the material conduit 108; and (3) the settings (the opening degree and frequency) of the pulse valve 117.

Possible examples of the connection point of the present invention are not limited to the examples of 103b and 103c described above. Possible examples include a mode in which high-pressure gas is introduced by structuring the gas supply source 101 with a high-pressure tank or the like, for example, while the piston pump 113 and the gas supply device 116 are omitted. Further, the constant flow amount pump 109 may be provided on either the upstream side or the downstream side of the connection point 115.

Next, a configuration of the dispenser 1 will be explained, with reference to FIGS. 2(A) and 2(B).

Figure 2A:
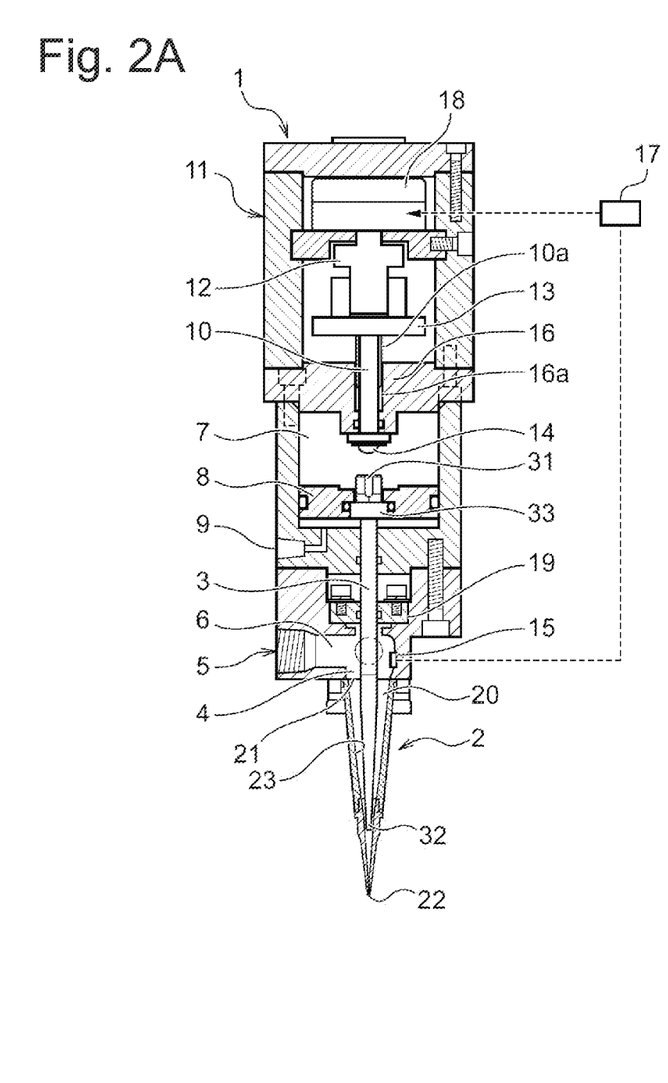

As show in FIG. 2A, the dispenser 1 includes a body 11 and the nozzle part 2 attached to a tip end part of the body 11.

The nozzle part 2 has formed therein a hollow space 20 penetrating from the basal end to the tip end of the nozzle part 2. As a result, a basal end opening 21 is formed at the basal end of the nozzle part 2, while a tip end opening 22 is formed at the tip end of the nozzle part 2. Further, on the inner surface of the nozzle part 2, a tapered section 23 is formed in which the inside diameter of the hollow space 20 on each cross-sectional plane perpendicular to the axial direction decreases toward the tip end opening 22. In the hollow space 20 of the nozzle part 2, the needle part 3 is inserted. As explained later, as a result of the needle part 3 moving up and down on the inside of the hollow space 20, the nozzle part 2 is opened and closed.

Figure 3:
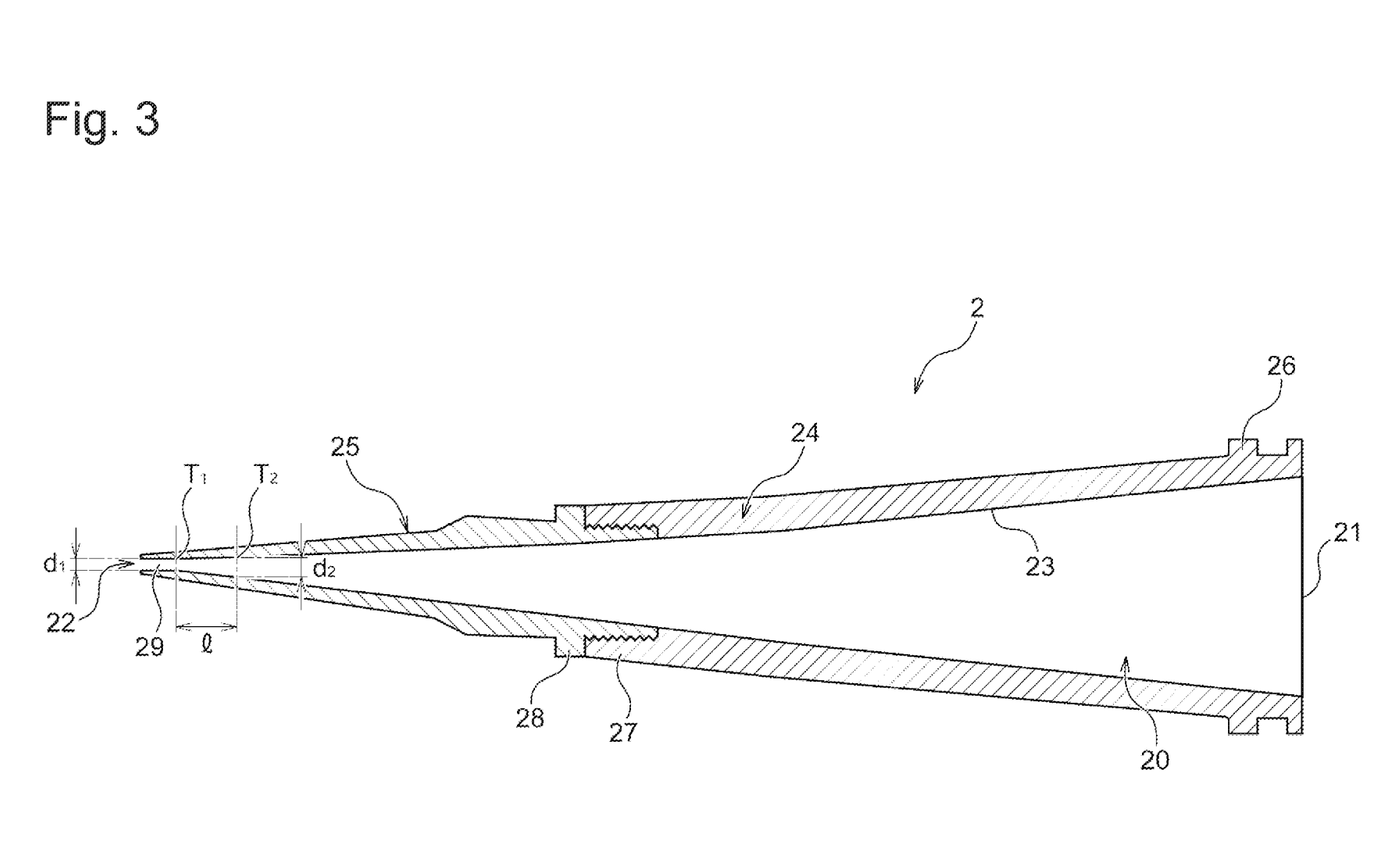
FIG. 3 is a cross-sectional side view of a nozzle (a first modification example) connected to the dispenser shown in FIG. 1.

As shown in FIG. 3 in detail, the nozzle part 2 is structured by connecting a nozzle body 24 and a nozzle tip end part 25 to each other by using respective engagement parts 27 and 28 thereof. The nozzle body 24 and the nozzle tip end part 25 have tapered sections having mutually the same inclination rate (the rate of change of the inside diameter with respect to the length in the axial direction), so that the tapered section 23 having the same inclination rate as a whole is formed by smoothly connecting the inner surfaces to each other. Needless to say, the present invention is not limited to this example. Possible structures of the nozzle part 2 include one in which the nozzle body 24 and the nozzle tip end part 25 are integrally formed. Alternatively, as explained in detail later, the inclination rate of the tapered section 23 may vary among different locations.

At the basal end of the nozzle body 24, the abovementioned basal end opening 21 is formed. On the outer circumference of the basal end, an engagement part 26 for attaching the nozzle part 2 while being engaged with the body 11 of the dispenser 1 is formed. At the farthest tip end of the nozzle tip end part 25, a discharge port 29 having the tip end opening 22 is formed. The inner surface of the discharge port 29 is formed to have an inside dimeter that is equal, in the whole length thereof, to the inside diameter of the tip end opening 22. In other words, the tapered section 23 ends at the most rearward edge of the inner surface of the discharge port 29.

Figure 4:
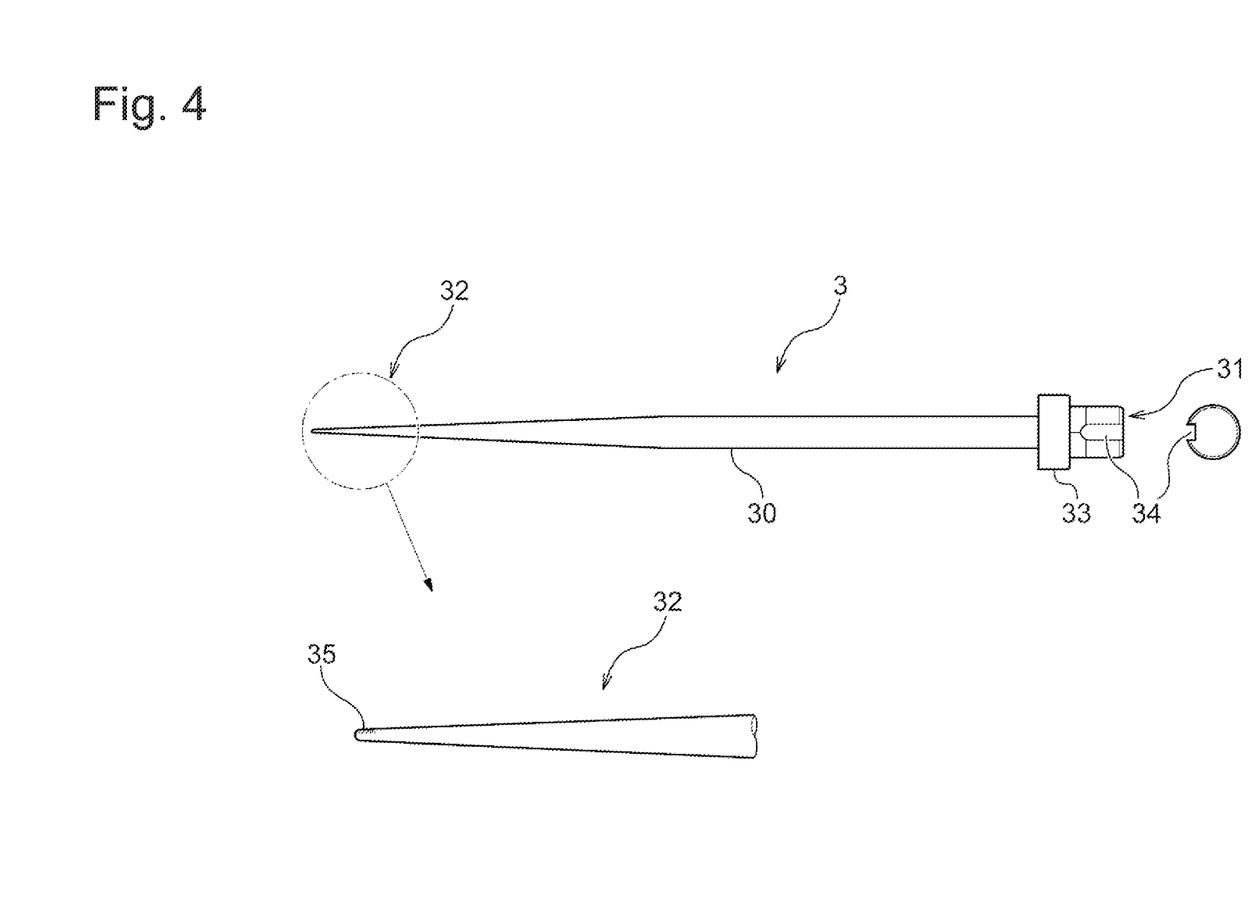
FIG. 4 is a side view of a needle part used with the nozzle (the first modification example) shown in FIG. 3 and an enlarged view of a tip end part of the needle part.

The needle part 3 for opening and closing the nozzle part 2 includes, as shown in FIG. 4 in detail, a needle body 30, a basal end part 31, a tip end part 32 formed in a tapered shape, and a large diameter part 33 formed in the vicinity of the basal end part 31. The basal end part 31 has an axial-direction groove 34 formed therein. As a result of a projection (not shown) of the piston part 8 being fitted in the axial-direction groove 34, it is possible to attach the needle part 3, without turning, to the piston part 8 during the operation of the needle.

The diameter of a tip end 35 (in the vicinity of the farthest tip end) of the tip end part 32 is formed to be equal to the inside diameter of the discharge port 29 or to be equal to the inside diameter of the tapered section 23 positioned in the vicinity of the discharge port 29. Accordingly, when the needle part 3 is inserted in the hollow space 20 of the nozzle part 2 and advanced, the tip end 35 of the needle part 3 is engaged in a closed position T1 (FIG. 3) on the inner wall of the tapered section 23 (including the boundary between the tapered section 23 and the discharge port 29), and at that time, the nozzle part 2 is closed (the state shown in FIGS. 2(A) and 2(8)). From this state, when the needle part 3 is retreated, because the tip end 35 of the needle part 3 moves away from the closed position T1 (FIG. 3), the nozzle part 2 is opened. In this situation, the closed position T1 (FIG. 3) may be set either in the vicinity of the boundary between the tapered section 23 and the discharge port 29 or inside the tapered section 23 positioned behind the discharge port 29, in accordance with the diameter of the tip end 35 of the needle part 3 and the inside diameter of the tapered section 23.

In the nozzle part 2 according to the present embodiment, the inclination rate of the tapered section 23 is determined in such a manner that, as shown in FIG. 3, the inside diameter d2 in a position T2 distant rearward from the closed position T1 by a distance 1 four times the diameter d1 of the tip end opening 22 is approximately 1.6 times larger than the diameter d1 of the tip end opening 22.

Returning to the description of FIG. 2A, the body 11 of the dispenser 1 includes: an introduction port 5 through which the mixture of the gas and the paste material is introduced; and a passage 6 extending from the introduction port 5 to the inside of the body 11. The passage 6 is linked to the basal end opening 21 of the nozzle part 2 and is connected from the introduction port 5 via the passage 6 through the hollow space 20 of the nozzle part 2 to the tip end opening 22, so that a flow path 4 for the mixture is formed in the dispenser 1, extending from the introduction port 5 to the tip end opening 22.

Further, the body 11 includes: a support part 19 that slidably supports the needle part 3 in a hermetic state; a cylinder part 7 formed behind (above in the drawing) the support part 19; the piston part 8 that moves up and down within the cylinder part 7; and a compressed air port 9 through which compressed air is put into and taken out of the space formed between the piston part 8 and the bottom face of the cylinder part 7. With the piston part 8, the large diameter part 33 formed in the vicinity of the basal end of the needle part 3 is fitted, so that the basal end part 31 of the needle part 3 protrudes upward from the piston part 8. The piston part 8 is biased downward by a spring (not shown) toward the position shown in FIG. 2A and in that state, the needle part 3 is closing the flow path 4 of the nozzle part 2. Alternatively, instead of the spring, the piston part 8 may be biased downward by compressed air pumped into the space in the cylinder part 7 positioned above the piston part 8.

Through the compressed air port 9, when the compressed air is pumped into the space formed between the piston part 8 and the bottom face of the cylinder part 7, the piston part 8 rises against the spring force due to the pressure from the compressed air. In conjunction with the rise, the needle part 3 fitted with the piston part 8 also rises, so that the tip end of the nozzle part 2 moves away from the closed position T1, which makes a transition from the closed state shown in FIG. 2A to an open state. After that, when the air in the space formed between the piston part 8 and the bottom face of the cylinder part 7 is released through the compressed air port 9, the piston part 8 falls due to the spring (not shown). In conjunction with the fall, the needle part 3 also falls so as to close the tip end opening 22 of the nozzle part 2. By moving the needle part 3 up and down in this manner, it is possible to open and close the tip end opening 22 of the nozzle part 2, i.e., to open and close the flow path 4.

When the mixture of the gas and the paste material is supplied through the introduction port 5, the mixture passes through the flow path 4 and reaches the vicinity of the tip end opening 22 of the nozzle part 2. When the needle part 3 has retreated upward to open the tip end opening 22, the mixture is discharged from the tip end opening 22 and is applied to the surface as a foamed body. When the needle part 3 is moved downward, because the tip end of the needle part 3 closes the tip end opening 22, the flow path 4 is closed so that the mixture stops being discharged.

Further, provided above the cylinder part 7 is a stopper support part 16 that defines the top face of the cylinder part 7. The stopper support part 16 has formed therein a penetrating hole 16a extending in the axial direction. A screw thread is formed on the inner surface of the penetrating hole 16a. A rod 10 on which a screw thread 10a is formed is screwed into the penetrating hole 16a. A tip end part 14 of the rod 10 protrudes into the cylinder part 7. When the needle part 3 is raised by a prescribed distance, the basal end part 31 of the needle part 3 abuts against the tip end part 14 of the rod 10 and stops the needle part 3 from rising further. In other words, the stopper support part 16, the rod 10, and the tip end part 14 thereof function as a stopper that restricts the operation range of the needle part 3.

It is possible to change the position of the rod 10 in the axial direction in accordance with the amount (hereinafter, "screw-in amount") by which the stopper support part 16 is screwed into the penetrating hole 16a. Accordingly, it is possible to adjust the operation range of the needle part 3 in accordance with the screw-in amount of the rod 10. It can be observed that, as shown in FIG. 2B, by making the screw-in amount of the rod 10 larger than that shown in FIG. 2A so as to move the tip end part 14 of the rod 10 further downward, it is possible to further restrict the operation range of the needle part 3. The rod 10 thus restricts the movable range of the tip end 35 (FIG. 4) of the needle part 3 to be the range from the closing position T1 (FIG. 3) to the stop position T2 (FIG. 3) distant rearward from the closing position T1 by the distance 1. Preferably, the distance 1 is equal to or longer than four times the diameter d1 of the tip end opening 22.

Figure 2B:
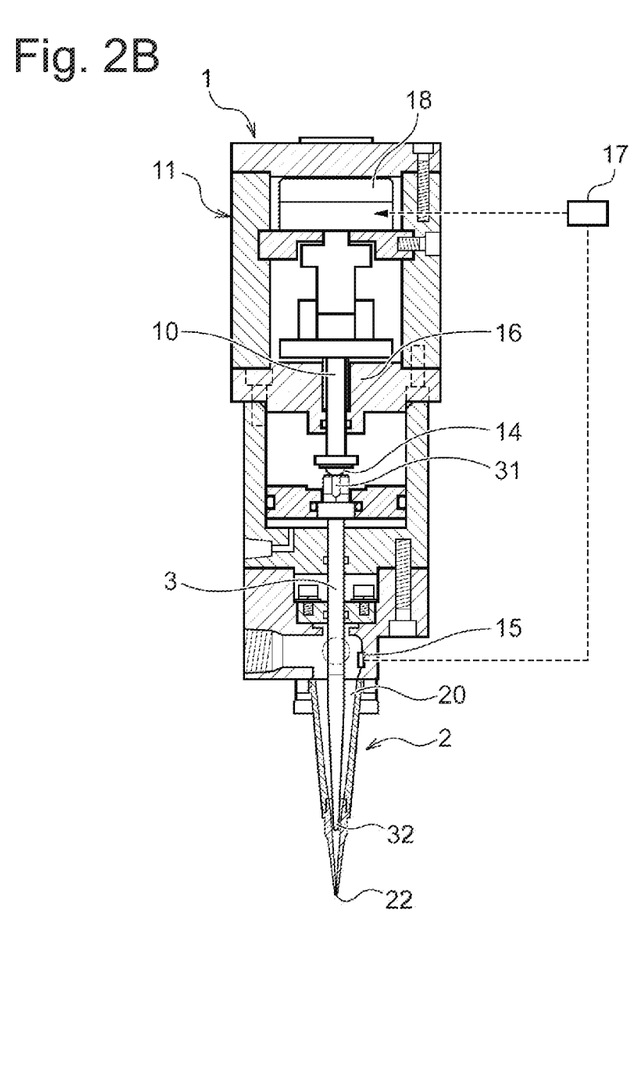

The screwing of the rod 10. i.e., the adjustment of the operation range of the needle part 3 may be performed manually; however, in the present embodiment, an electric stopper position adjusting part is employed as shown in FIGS. 2(A) and 2(B). In other words, the electric stopper position adjusting part includes an electric motor part 18 and is configured to transmit the rotation of the electric motor part 18 to a basal end part 13 of the rod 10 via a rotation transmitting part 12.

Figure 7A:
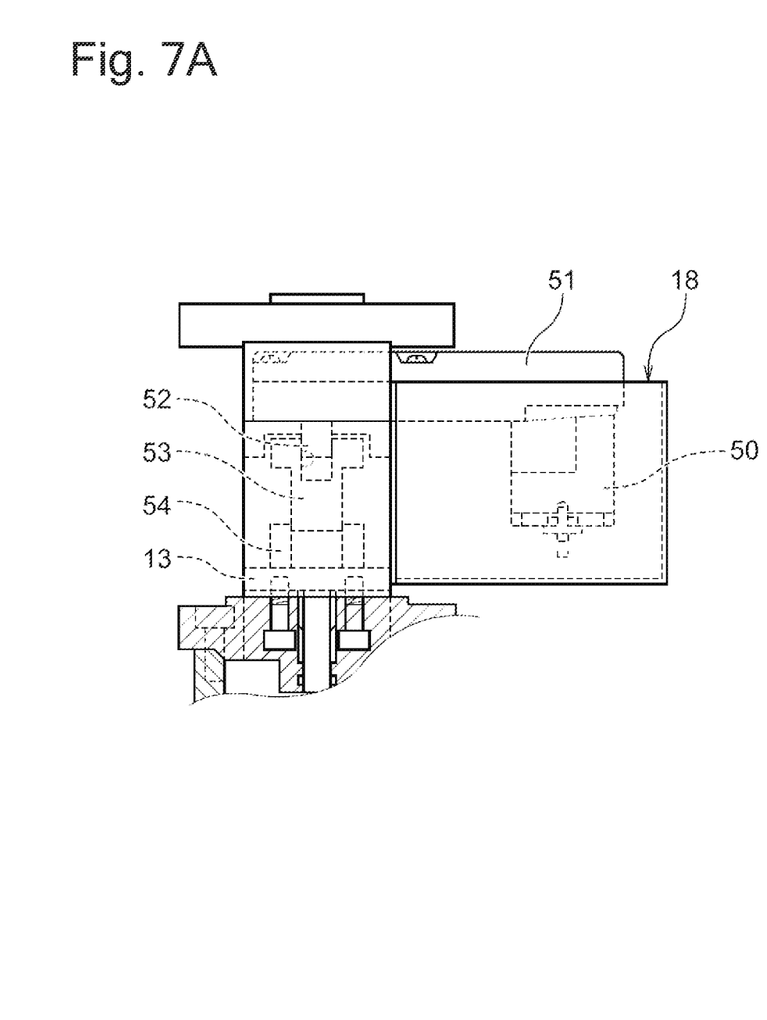
FIGS. 7A and 7B are schematic drawings of an electric stopper position adjusting part that adjusts the position of a stopper part according to an embodiment of the present invention.
Figure 7B:
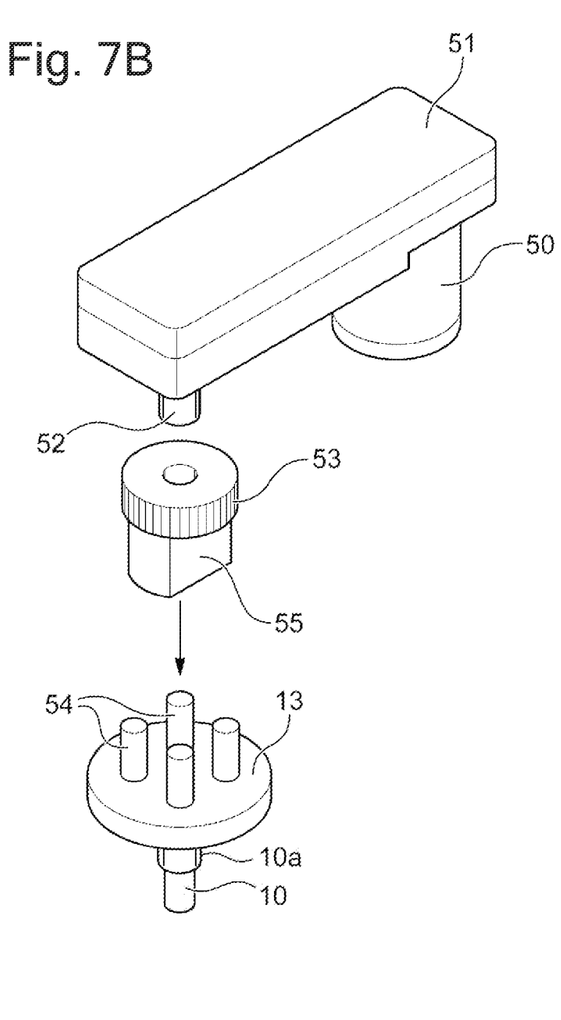

As shown in detail in FIGS. 7A and 7B, the electric motor part 18 includes: an electric motor 50; a reduction gear 51 that reduces the rotation speed of the electric motor 50; an output shaft 52 of the reduction gear 51; and a rotation plate 53 fitted with the output shaft 52. In the basal end part 13 of the rod 10, four cylindrical projections 54 protrude upright.

The rotation transmitting part 12 (FIG. 2A) is structured as a result of fitting a plate part 55 that perpendicularly extends from a bottom part of the rotation plate 53 into the gaps between the adjacently-positioned cylindrical projections 54, so that the rotation of the output shaft 52 of the electric motor part 18 is transmitted to the rod 10.

Further, the dispenser 1 further includes a controller 17 that controls the electric motor part 18 so as to adjust the position of the tip end part 14 of the rod 10. i.e., the operation range of the needle part 3 (3b). Although the controller 17 is arranged in a control panel of the mechanical foaming device 100 in FIG. 1, the present invention is not limited to this example. Also, the dispenser 1 may further include a pressure sensor 15 provided in the flow path 4. A pressure detection signal from the pressure sensor 15 is sent to the controller 17, so that the controller 17 is able to use the pressure detection signal, i.e., the pressure in the flow path 4 for controlling the electric motor part 18.

Figure 5:
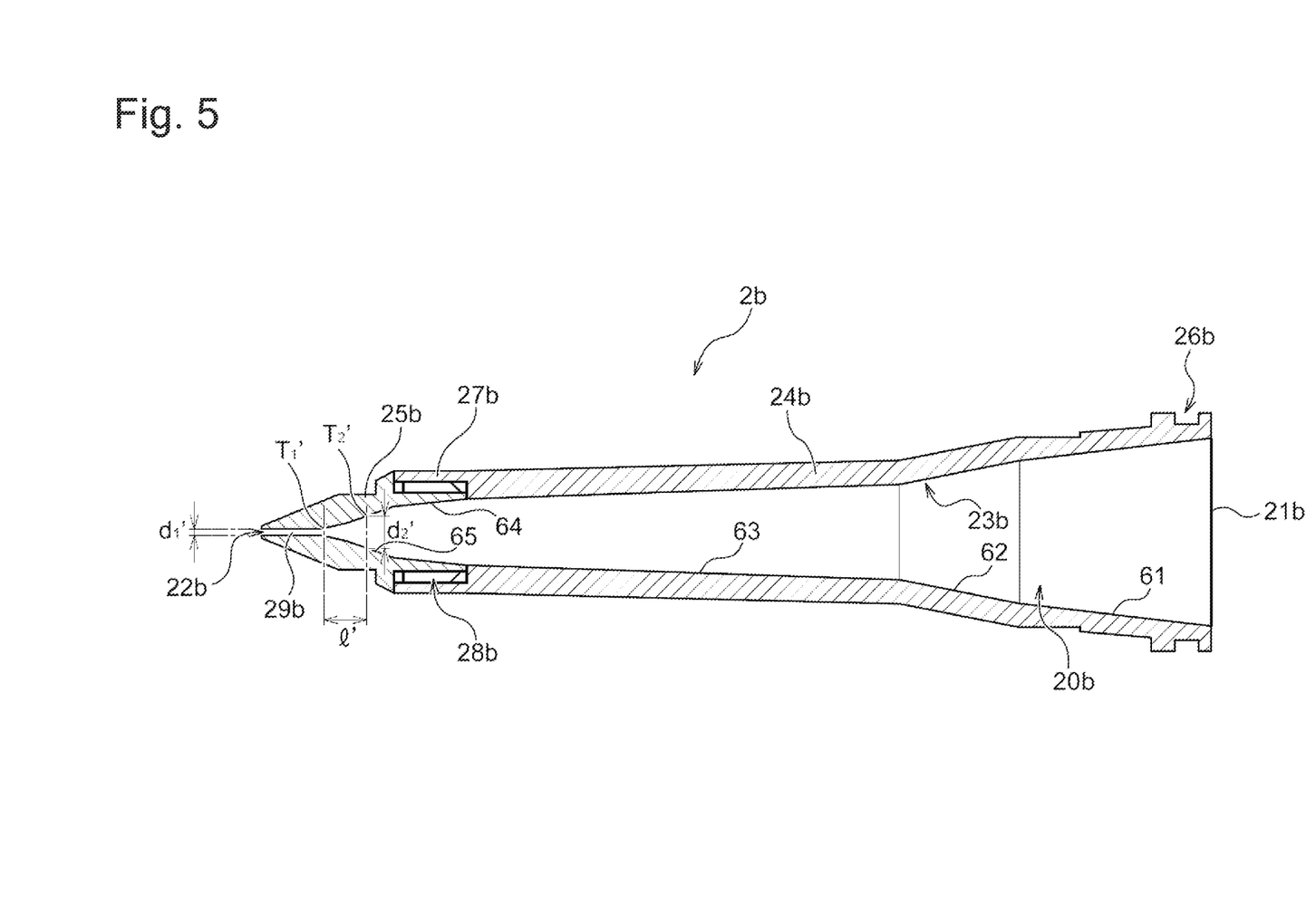
FIG. 5 is a cross-sectional side view of another nozzle (a second modification example) connectable to the dispenser shown in FIG. 1.
Figure 6:
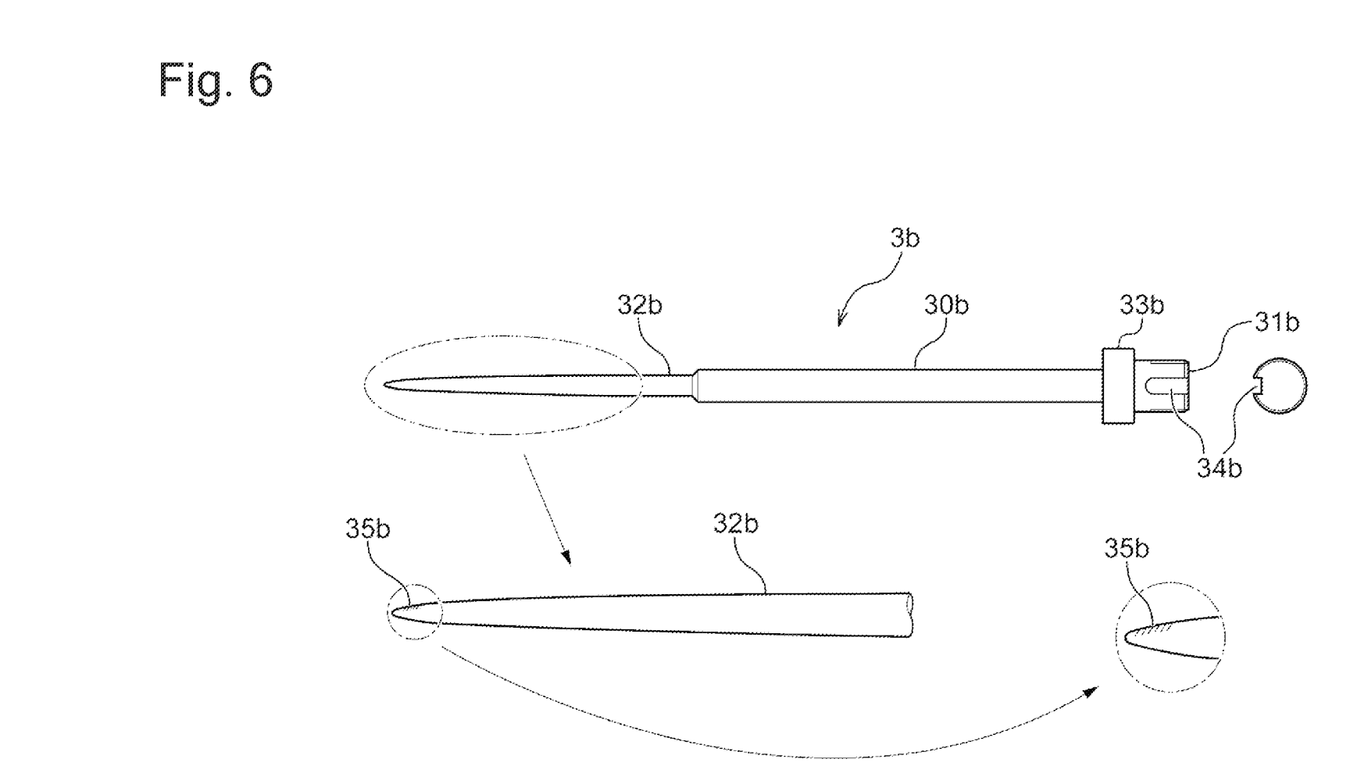
FIG. 6 is a side view of a needle part used with the nozzle (the second modification example) shown in FIG. 5 and an enlarged view of a tip end part of the needle part.

The nozzle part 2 and the needle part 3 have thus been described as embodiments of the present invention; however, the present invention is not limited to these examples. Next, while the nozzle part 2 and the needle part 3 described above are regarded as a first modification example, a nozzle part and a needle part according to a second modification example will be explained, with reference to FIGS. 5 and 6. In FIGS. 5 and 6, some of the constituent elements that are the same as those in the first modification example will be referred to by appending the letter "b" to the same reference numerals. Detailed explanations of those elements will be omitted, and the following will primarily describe differences.

As shown in FIG. 5, in a nozzle part 2b according to the second modification example, a tapered section 23b is formed with a plurality of tapered subsections 61, 62, 63, 64, and 65 having mutually-different inclination rates, which is different from the nozzle part 2 according to the first modification example. A needle part 3b shown in FIG. 6 is inserted in a hollow space 20b of the nozzle part 2b. Similarly to the needle part 3 in the first modification example, the needle part 3b includes a needle body 30b, a basal end part 31b, a tip end part 32b formed in a tapered shape, and a large diameter part 33b formed in the vicinity of the basal end part 31b. A difference from the first modification example lies in that there is a step between the needle body 30b and the tip end part 32b.

In the nozzle part 2b according to the second modification example, as shown in FIG. 5, the inclination rate of the tapered section 23b (the tapered subsection 65 in the example in FIG. 5) is determined in such a manner that the inside diameter d2' in a position T2' distant rearward from a closed position T1' by a distance 1' four times the diameter d1' of the tip end opening 22b is approximately 2.9 times larger than the diameter d1' of the tip end opening 22b. In other words, in the second modification example, d2'/d1'=2.9 is satisfied, in contrast to d2/d1=1.6 in the first modification example. When the diameter of the tip end opening is equal, the inclination rate of the tapered section is larger in the second modification example. In an embodiment of the present invention, a preferable range of the inclination rate d2/d1 is 1.1 to 4.

Next, effects of one embodiment of the present invention will be explained.

A mixture in which gas and a paste material are micro-dispersed is supplied to the introduction port 5 of the dispenser 1 from the mechanical foaming device 100. The introduced mixture passes through the flow path 4 and reaches the vicinity of the tip end opening 22 (22b) of the nozzle part 2 (2b). When the dispenser 1 is brought to a discharge position, the robot 106 introduces compressed air to the cylinder part 7 through the compressed air port 9. Due to the introduced compressed air, the piston part 8 rises so that the tip end 35 (35b) of the needle part 3 (3b) moves away from the closed position T1 (T1'), and the flow path 4 reaching the stopper tip end opening 22 (22b) changes from the closed state to the open state. The basal end part 31 (31b) of the needle part 3 (3b) abuts against the tip end part 14 of the rod 10 and stops.

In this situation, the foamed body passes through the open flow path 4 and is discharged from the tip end opening 22 (22b) to be applied to a surface as the foam beads 110. In this situation, the mixture passing through the flow path 4 is reduced in pressure when the tip end opening 22 (22b) is opened, but there is no drastic change in the inside diameter or the pressure while the mixture passes through the tapered section 23 (23b). Also, the mixture is able to maintain relatively high pressure until immediately before being discharged. Accordingly, it is possible to avoid the situation where the bubbles become large due to aggregation caused by the pressure getting lower during the passing through the nozzle. It is therefore possible to keep small the foamed cells of the foamed body after being discharged. Also, because the bubbles are prevented from becoming large, it is possible to inhibit the bubbles from breaking and to thus stabilize the foam expansion ratio. In other words, it is possible to apply the foam beads that have a desired foam expansion ratio and in which the bubbles are evenly dispersed. The desired foam expansion ratio is preferably 3 times or more and may be 3.5 times, 4 times, or 5 times. Further, variance of the foam expansion ratio is 10% or lower and is preferably 5%. The present invention realizes the desired foam expansion ratio and is also able to keep the variance thereof within the preferable range. Further, with the tapered section 23 (23b), because it is possible to maintain the pressure of the mixture relatively high until immediately before being discharged, there is no need to supply the paste material to the dispenser 1 at extremely high pressure. It is therefore possible to proactively prevent clogging of the material and reactions of the mixture before being discharged.

The pressure of the mixture at the time of being discharged has a certain relationship not only with the viscosity of the paste material and the discharge flow amount of the mixture, but also with a needle gap amount, which is a value indicating an operation range of the needle part 3 (3b). As shown in FIG. 3 (FIG. 5), the needle gap amount is the distance 1 (1') between the stop position T2 (12) and the closed position T1 (T1') of the tip end 35 (35b), when the needle part 3 (3b) abuts against the tip end part 14 of the rod 10.

Figure 8:
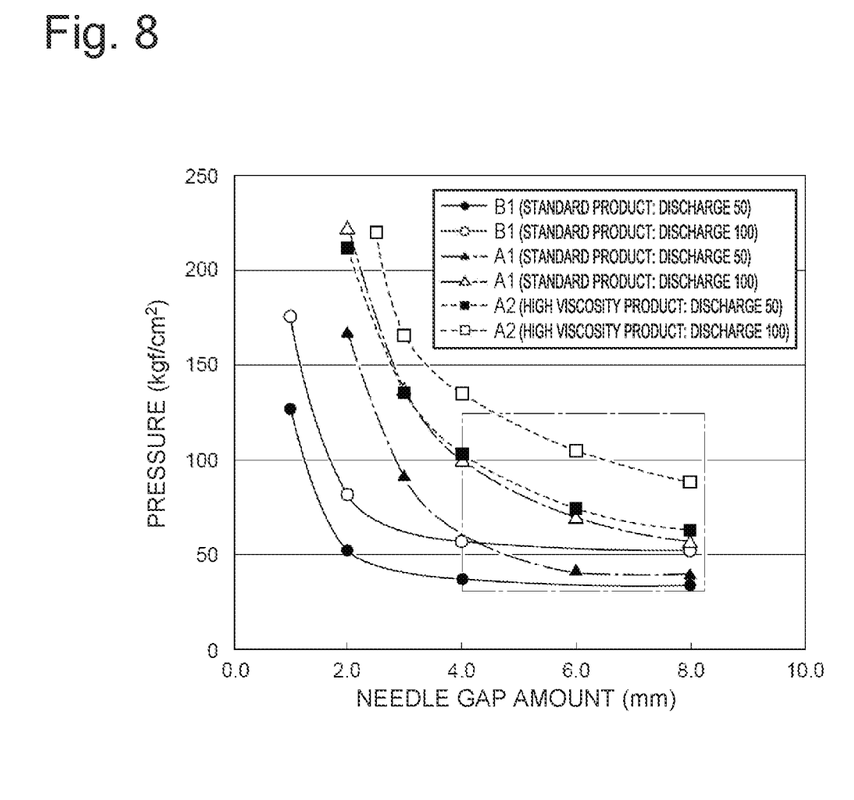
FIG. 8 is a graph showing a relationship between a needle gap amount and pressure inside a flow path of the dispenser.

FIG. 8 shows a relationship of mixture discharge pressure with needle gap amounts. In FIG. 8, "A1" denotes a resultant from the first modification example (the nozzle part 2 and the needle part 3) using a standard paste material (viscosity: 80,000 mPa·s (measured shear velocity: 4.2 sec$^{-1}$)); "A2" denotes a result of the first modification example (the nozzle part 2 and the needle part 3) using a paste material having a high viscosity (viscosity: 120,000 mPa·s); and "B1" denotes a result of the second modification example (the nozzle part 2b and the needle part 3b) using the standard paste material. In the present example, the paste material having the high viscosity was obtained by slightly increasing the viscosity by leaving the standard paste material at 40° C. for approximately two weeks. Further, with A1 and B1, tests were performed with discharge flow amounts of 50 g/min and 100 g/min.

The graph in FIG. 8 indicates that, in all the dispensers, as the needle gap amount increases, the discharge pressure drastically decreases and approaches a certain level of pressure.

Accordingly, it means that, when the viscosity of the paste material to be used is given, the needle gap amount of the needle part 3 (3*b*) should be adjusted so as to achieve a desirable level of pressure that will exert the abovementioned advantage effect with the used dispenser, with respect to the discharge flow amount of the mixture. For this purpose, the controller 17 is configured to calculate the position T2 (T2') within the nozzle part 2 (2*b*) in which the tip end 35 (35*b*) of the needle part 3 (3*b*) forms the needle gap amount achieving the desired level of pressure, to further calculate the position of the tip end part 14 of the rod 10, i.e., the screw-in amount of the rod 10, corresponding to the position T2 (17), and to control the rotation of the electric motor 50 in the electric motor part 18 to rotate the rod 10 with the calculated screw-in amount.

Preferably, the controller 17 exercises feedback control on the needle gap amount by controlling the electric motor 50 so that the pressure of the mixture in the flow path 4 detected by the pressure sensor 15 falls within a desirable pressure range.

Further, as explained above, when the screwing of the rod 10, i.e., the operation range of the needle part 3 (3*b*) is adjusted manually without using the electric motor, the controller 17 may be omitted. In that situation, preferably, a display device displaying the pressure detected by the pressure sensor 15 may be provided, so that the user is able to adjust the operation range of the needle part 3 (3*b*) while looking at the displayed pressure level.

The one embodiment of the present invention has thus been explained. The present invention, however, is not limited to the example described above. It is possible to arbitrarily modify the present invention as appropriate, within the scope thereof.

For example, in the example in FIG. 1, the dispenser 1 is controlled as being attached to the robot 106; however, another configuration is also acceptable in which the foamed body is discharged as the user holds the dispenser 1 and presses a switch. Further, it is also acceptable to use a mechanism for mixing the gas and the paste material together that is different from the mechanical foaming device 100.

Further, as the mechanisms driving the needle part 3 or 3*b*, the example described above employs the raising mechanism of the piston part 8 using the compressed air introduced to the inside of the cylinder part 7 through the compressed air port 9 and the lowering mechanism of the spring (not shown); however, it is also acceptable to employ raising and lowering mechanisms for the needle part 3 or 3*b* using an electric motor. As for the mechanism of the stopper position adjusting part, the present invention is not limited to the example using the screwing of the rod as shown in FIGS. 2A and 2B. For instance, it is also acceptable to use a sliding style such as a cylinder.

REFERENCE SIGNS LIST

1: dispenser
2, 2*b*: nozzle part
3, 3*b*: needle part
4: flow path
5: introduction port
6: passage extending from the introduction port 5 to the inside of the body 11
7: cylinder part
8: piston part
9: compressed air port
10: rod
10*a*: screw thread of the rod
11: body of the dispenser
12: rotation transmitting part
13: basal end part of the rod
14: tip end part of the rod
15: pressure sensor
16: stopper support part
16*a*: penetrating hole with the screw thread
17: controller
18: electric motor part
19: support part of the needle part
20, 20*b*: hollow space
21, 21*b*: basal end opening
22, 22*b*: tip end opening
23, 23*b*: tapered section
24, 24*b*: nozzle body
25, 25*b*: nozzle tip end part
26, 26*b*: engagement part of the nozzle body with the dispenser body
27, 27*b*: engagement part of the nozzle body
28, 28*b*: engagement part of the nozzle tip end part
29, 29*b*: discharge port
30, 30*b*: needle body
31, 31*b*: basal end part of the needle part
32, 32*b*: tip end part of the needle part
33, 33*b*: large diameter part
34, 34*b*: axial-direction groove
35, 35*b*: tip end of the tip end part
50: electric motor
51: reduction gear
52: output shaft of the reduction gear 51
53: rotation plate
54: cylindrical projection
100: mechanical foaming device
101: gas supply source
102: paste material supply source
103: connection part
104: mixer
105: constant flow amount cylinder
106: robot
107: gas conduit
108: material conduit
109: constant flow amount pump
110: foam beads
111, 112, 113: piston pump
114: opening/closing valve
115: connection point
116: gas supply device
117 pulse valve

The invention claimed is:

1. A dispenser used for discharging a mixture of gas and a paste material, the dispenser comprising:
   a nozzle part provided in a tip end part of the dispenser and having a tip end opening through which the mixture is discharged;
   a flow path for the mixture extending from an introduction part for the mixture to the tip end opening through an inside of the nozzle part;
   a needle part movable in the flow path of the nozzle part to open and close the flow path; and
   a driving part that drives the needle part, wherein
   the nozzle part has a tapered section in which an inside diameter of the flow path of the nozzle part decreases toward the tip end opening, the inside diameter being relative to an operation range of a tip end of the needle part, as a result of the tip end of the needle part abutting against a closed position of the tapered section, the flow path for the mixture is closed, whereas as a result of the tip end of the needle part moving away from the closed position, the flow path is opened, the dispenser further comprises a stopper part that limits a moving range of the tip end of the needle part to a range from the closed position to a stop position located rearward relative to the closed position, and a stopper position adjusting part that adjusts a position of the stopper part to change the stop position, wherein the stopper position adjusting part comprises    a rod screwed into a body of the dispenser in an axial direction, a position of the rod in the axial direction being adjusted according to an amount of being screwed into the body, the needle part being stopped as a result of a tip end part of the rod abutting against a basal end part of the needle part, and    a pressure sensor that measures a pressure of the mixture in the flow path, wherein the stopper position adjusting part further includes any one of (i) and (ii):

(i) an electric motor disposed to rotate the rod, and a controller that controls the stop position by controlling a rotation amount of the rod rotated by the electric motor, such that the pressure measured by the pressure sensor falls in a desired pressure range with respect to a discharge flow amount of the mixture;

(ii) a mechanism that makes the rod manually rotatable, and a display unit that displays the pressure measured by the pressure sensor    wherein the operation range of the needle part is adjustable manually by adjusting a rotation amount of the rod rotated by the mechanism while looking at the pressure level detected by the pressure sensor and displayed by the display unit, and    wherein the dispenser is configured such that the pressure of the mixture dispensed from the tip end opening is controlled by adjusting the operation range of the needle part with respect to the discharge flow amount of the mixture.

2. The dispenser according to claim 1, wherein a rearmost position of the stop position adjusted by the stopper position adjusting part is a position distant from the closed position by a distance equal to or longer than four times a diameter of the tip end opening.

3. The dispenser according to claim 2, wherein in the position distant rearward from the closed position by a distance four times the diameter of the tip end opening, the inside diameter of the flow path is 1.1 to 3 times larger than the diameter of the tip end opening.

4. A mechanical foaming device that discharges a mixture of gas and a paste material, the mechanical foaming device comprising:

a gas conduit used for transporting the gas;

a material conduit used for transporting the paste material;

a connection part to which the gas conduit and the material conduit are connected;

a mixing part that mixes together the gas and the paste material coming out of the connection part; and    the dispenser according to claim 1 that receives a supply of the mixture of the gas and the paste material coming out of the mixing part.

5. The mechanical foaming device according to claim 4, wherein the connection part is at least one piston pump, the gas conduit and the material conduit are connected to a cylinder of the piston pump, and into a cylinder space formed by raising a piston of the piston pump, the gas transported through the gas conduit and the paste material transported through the material conduit are supplied, so that the gas and the paste material in the cylinder space are pumped forward to the mixing part as a result of lowering the piston.

6. The mechanical foaming device according to claim 4, wherein the connection part is a part in which the gas conduit is connected to the material conduit via a piston pump and an opening/closing valve, and into a cylinder space formed by raising a piston of the piston pump while the opening/closing valve is closed, the gas transported through the gas conduit is supplied, so that the gas in the cylinder space is compressed as a result of lowering the piston, and so that the compressed gas is mixed into the paste material transported through the material conduit as a result of opening the opening/closing valve.

7. The mechanical foaming device according to claim 4, further comprising:

a constant flow amount device that supplies, to the dispenser, the mixture of the gas and the paste material mixed by the mixing part, in a constant flow amount.

* * * * *